US008867407B2

(12) United States Patent
Chang

(10) Patent No.: US 8,867,407 B2
(45) Date of Patent: Oct. 21, 2014

(54) METHOD, SYSTEM AND APPARATUS FOR ACCESSING NETWORK

(75) Inventor: Zhi Chang, Xian (CN)

(73) Assignee: Huawei Device Co., Ltd., Shenzhen (CN)

( * ) Notice: Subject to any disclaimer, the term of this patent is extended or adjusted under 35 U.S.C. 154(b) by 598 days.

(21) Appl. No.: 13/207,070

(22) Filed: Aug. 10, 2011

(65) Prior Publication Data
US 2011/0299518 A1 Dec. 8, 2011

Related U.S. Application Data

(63) Continuation of application No. PCT/CN2010/070447, filed on Feb. 1, 2010.

(30) Foreign Application Priority Data

Feb. 10, 2009 (CN) .......................... 2009 1 0005664

(51) Int. Cl.
H04L 12/28 (2006.01)
H04B 7/216 (2006.01)
H04W 48/18 (2009.01)
H04W 88/06 (2009.01)
H04W 76/02 (2009.01)

(52) U.S. Cl.
CPC .............. H04W 48/18 (2013.01); H04W 88/06 (2013.01); H04W 76/02 (2013.01)
USPC ......... 370/255; 370/342; 370/395.5; 370/441

(58) Field of Classification Search
CPC ....... H04L 9/0897; H04L 9/3236; H04L 5/00; H04W 4/005; H04W 48/18; H04W 88/06; H04W 76/02
USPC ......... 370/254, 255, 280, 281, 294, 295, 320, 370/328, 342, 395.5, 441, 465
See application file for complete search history.

(56) References Cited

U.S. PATENT DOCUMENTS 6,108,562 A * 8/2000 Rydbeck et al. ........... 455/552.1
7,475,806 B1 1/2009 Crossno et al.
(Continued)

FOREIGN PATENT DOCUMENTS

CN 1578521 A 2/2005
CN 1592168 A 3/2005
(Continued)

OTHER PUBLICATIONS

Office Action issued in corresponding Chinese Patent Application No. 200910005664.6, mailed Nov. 2, 2011.
(Continued)

Primary Examiner — Benjamin H Elliott, IV
(74) Attorney, Agent, or Firm — Brinks Gilson & Lione

(57) ABSTRACT

A method, a system and an apparatus for accessing a network are provided. The method includes: identifying, through the network interface, the type of a network module connected with a network interface, where each type of the network module corresponds to one type of 3G network; according to the type of the network module, establishing a connection between the network module and the 3G network corresponding to the network module; and accessing the corresponding 3G network through the network module. In the embodiments of the present invention, the 3G networks with different modes c an be accessed by identifying the types of different network modules, and therefore multi-mode upstream access can be satisfied, the application range of a router for accessing the 3G network is widened, and upstream access cost is reduced when different 3G networks with different modes need to be accessed.

14 Claims, 5 Drawing Sheets

(56) References Cited

U.S. PATENT DOCUMENTS

| | | |
|---|---|---|
| 2002/0068608 A1 | 6/2002 | Souissi |
| 2005/0009530 A1 | 1/2005 | Rouffet et al. |
| 2008/0189556 A1 | 8/2008 | Modica et al. |
| 2008/0282335 A1 | 11/2008 | Abzarian et al. |
| 2010/0177750 A1* | 7/2010 | Essinger et al. ............ 370/338 |
| 2011/0299518 A1* | 12/2011 | Chang ......................... 370/342 |

FOREIGN PATENT DOCUMENTS

| | | | |
|---|---|---|---|
| CN | 1592205 | A | 3/2005 |
| CN | 1809185 | A | 7/2006 |
| CN | 101163291 | A | 4/2008 |
| CN | 201114586 | Y | 9/2008 |
| CN | 101287208 | A | 10/2008 |
| CN | 101340345 | A | 1/2009 |
| CN | 101483906 | A | 7/2009 |
| EP | 0720304 | A2 | 7/1996 |
| KR | 10-2007-0060184 | A | 6/2007 |
| WO | WO 99/09771 | A1 | 2/1999 |

OTHER PUBLICATIONS

Office Action issued in corresponding Chinese Patent Application No. 200910005664.6, mailed Apr. 11, 2012.

Office Action issued in corresponding Chinese Patent Application No. 200910005664.6; mailed Jan. 8, 2010.

International Search Report issued in corresponding PCT Application No. PCT/CN2010/070447; mailed May 6, 2010.

Written Opinion of the International Searching Authority issue in corresponding PCT Application No. PCT/CN2010/070447; mailed May 6, 2010.

Extended European Search Report issued in corresponding European Patent Application No. 10740904.7, mailed Jun. 21, 2013, 6 pages.

* cited by examiner

METHOD, SYSTEM AND APPARATUS FOR ACCESSING NETWORK

CROSS-REFERENCE TO RELATED APPLICATIONS

This application is a continuation of International Application No. PCT/CN2010/070447, filed on Feb. 1, 2010, which claims priority to Chinese Patent Application No. 200910005664.6, filed on Feb. 10, 2009, both of which are incorporated by reference in their entireties.

FIELD OF THE INVENTION

The present invention relates to the field of communication technology, and in particular, to a method, a system and an apparatus for accessing a network.

BACKGROUND OF THE INVENTION

In the prior art, a common wireless gateway such as a wireless router usually adopts wired means such as broadband technology or asymmetric digital subscriber line (ADSL) technology to access an upstream network, and Ethernet or wireless local area network (WLAN) is used to access a downstream network. The wireless router provides functions such as dynamic host configuration protocol (DHCP) service, automatic allocation of an Internet protocol (IP) address of a private network, network address translation (NAT) of an IP address, and network firewall, so as to enable multiple users to access a network.

With the development of wireless communication technology, in areas where 3G networks are advanced, a wireless router based on 3G wireless technology (referred to hereinafter as a 3G wireless router) is used to access a network in a wireless manner. A 3G wireless module is added inside the 3G wireless router through a universal serial bus (USB) interface or a personal computer memory card international association (PCMCIA) interface. Through the 3G wireless module, the 3G wireless router accesses a 3G network in a wireless manner, and accesses an upstream network through a 3G network operator.

In the research process of the conventional 3G wireless router, the inventor finds that the same area may be covered by the 3G networks with different modes, such as wideband code division multiple access (WCDMA), code division multiple access (CDMA), and time division-synchronous code division multiple access (TD-SCDMA). Although the conventional 3G wireless router may realize an upstream wireless access to a network, the 3G wireless module in the 3G wireless router can only support a 3G wireless access with a single mode. For example, a WCDMA wireless router includes a WCDMA wireless module, and thus can only access a WCDMA network, and cannot access a CDMA network or TD-SCDMA network. As can be known, the conventional 3G wireless router can only support the 3G network with the single mode, and therefore multi-mode upstream access cannot be satisfied, and the application range of the 3G wireless router is limited. Different wireless routers are required when 3G networks with different modes need to be accessed, thereby adding upstream access cost.

SUMMARY OF THE INVENTION

The embodiments of the present invention provide a method, a system and an apparatus for accessing a network, so as to satisfy the need for multi-mode access to a network and reduce cost of upstream access to a 3G network.

In order to achieve objectives of the embodiments of the present invention, an embodiment of the present invention provides the following technical solutions.

A method for accessing a network is provided, where the method includes:

Identifying, through the network interface, the type of a network module connected with a network interface, where each type of the network module corresponds to one type of 3G network;

according to the type of the network module, establishing a connection between the network module and the 3G network corresponding to the network module; and accessing the corresponding 3G network through the network module.

A system for accessing a network is provided, where the system includes:

a network module, configured to establish a connection with the 3G network;

a router, connected with the network module through a network interface, and configured to identify the type of the network module through the network interface, where each type of the network module corresponds to one type of 3G network; and configured to establish, according to the type of the network module, the connection between the network module and the 3G network corresponding to the network module, and access the 3G network through the network module.

An apparatus for accessing a network is provided, where the apparatus includes:

an identifying unit, configured to identify, through the network interface, the type of a network module connected with a network interface, where each type of the network module corresponds to one type of 3G network;

an establishing unit, configured to establish, according to the type of the network module, a connection between the network module and the 3G network corresponding to the network module; and an access unit, configured to access the 3G network through the network module.

It can be seen from the technical solutions provided by the embodiments of the present invention that in the embodiments of the present invention, the type of the network module connected with a network interface is identified through the network interface; according to the identification result, a connection between the network module and the 3G network corresponding to the network module is established; and the 3G network is accessed through the network module. In the embodiments of the present invention, the 3G networks with different modes can be accessed by identifying the types of different network modules. In this way, multi-mode upstream access can be satisfied, the application range of a router for accessing the 3G network is widened, and upstream access cost is reduced when 3G networks with different modes need to be accessed.

DETAILED DESCRIPTION OF THE EMBODIMENTS

The embodiments of the present invention provide a method, a system and an apparatus for accessing a network. The type of a network module connected with a network interface is identified through the network interface, and each type of the network module corresponds to one type of 3G network. According to the type of the network module, a connection between the network module and the 3G network corresponding to the network module is established. The corresponding 3G network is accessed through the network module.

In order to make the solutions of the present invention better understood by persons skilled in the art, and to make the above objectives, characteristics and merits of the present invention clearer and understandable, the embodiments of the present invention are further described in detail with reference to accompanying drawings.

Figure 1:
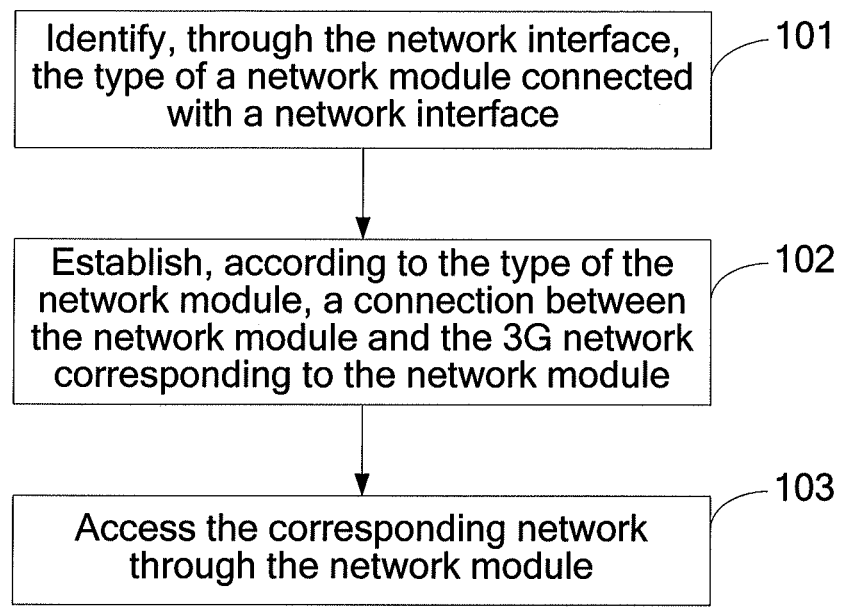
FIG. 1 is a flow chart of a method for accessing a network according to a first embodiment of the present invention.

FIG. 1 is a flow chart of a method for accessing a network according to a first embodiment of the present invention. As shown in FIG. 1, the method includes the following steps.

In step 101, the type of a network module connected with a network interface is identified through the network interface.

In step 102, according to the type of the network module, a connection between the network module and the 3G network corresponding to the network module is established.

In step 103, the corresponding 3G network is accessed through the network module.

The network interface may be a USB interface, a PCMCIA interface, or a user-defined interface; and the 3G network is one of the conventional TD-SCDMA network, the conventional WCDMA network, or the conventional CDMA network.

Figure 2:
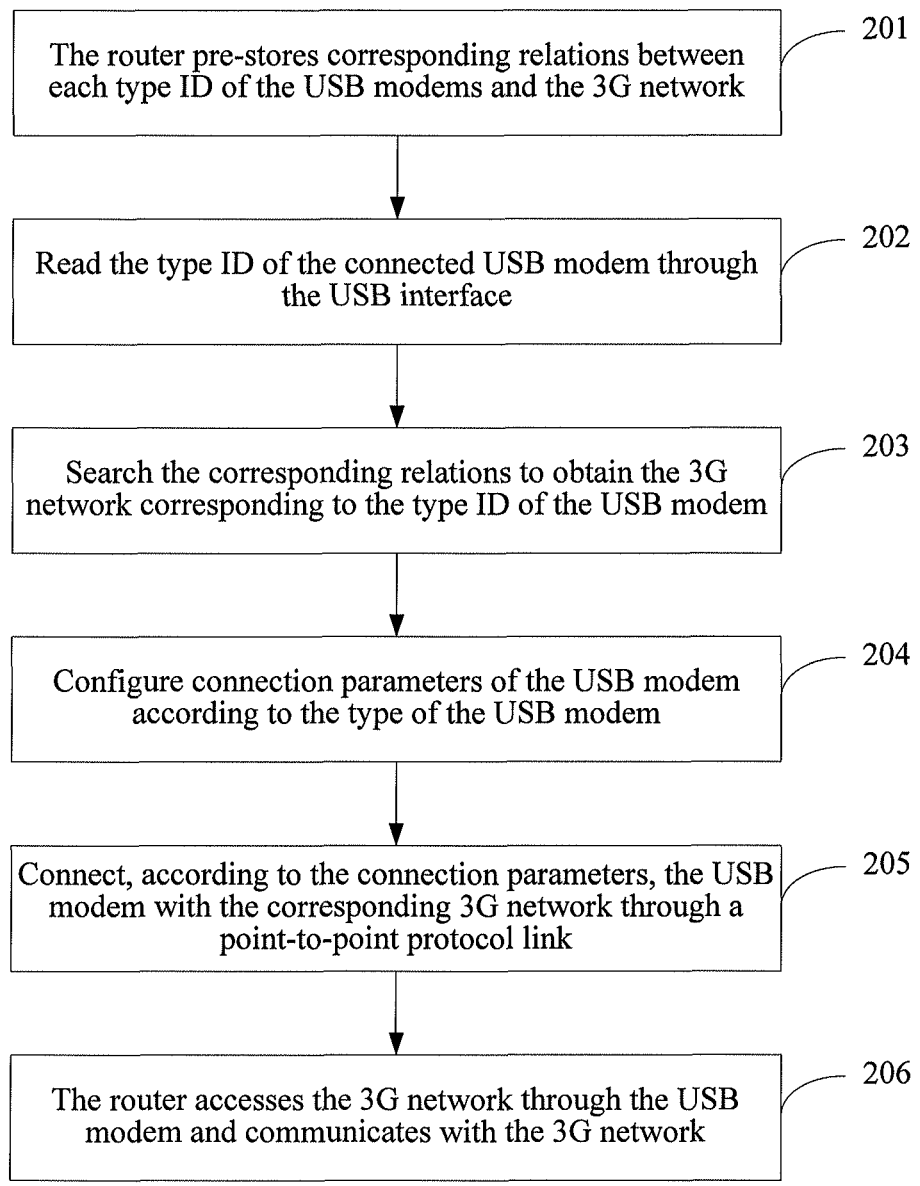
FIG. 2 is a flow chart of the method for accessing a network according to a second embodiment of the present invention.

FIG. 2 is a flow chart of a method for accessing a network according to a second embodiment of the present invention. As shown in FIG. 2, the embodiment illustrates in detail the process that a router identifies the type of a USB modem through a USB interface and accesses a corresponding 3G network.

In step 201, the router pre-stores corresponding relations between each type identification (ID) of the USB modems and the 3G network.

As different USB modems can access different 3G networks, corresponding relations between different USB modems and different 3G networks can be pre-stored, and the corresponding relations may be stored in the form of a table, as shown in the following Table 1.

TABLE 1

| | Type ID | | |
|---|---|---|---|
| | USB Modem 1 | USB Modem 2 | USB Modem 3 |
| 3G network | WCDMA | TD-SCDMA | CDMA |

In step 202, through the USB interface, the type ID of the USB modem that is connected with the USB interface is read.

After the USB interface of the router is connected with the USB modem, the USB interface of the router is a host interface and the USB interface of the USB modem is a device interface. The router can read the device interface of the USB modem through the host interface of the router, so as to obtain the type ID of the USB modem.

In this embodiment, it is assumed that the read type ID of the USB modem is "2".

In step 203, the corresponding relations are searched to obtain the 3G network corresponding to the type ID of the USB modem.

According to the obtained type ID of the USB modem, that is "2", the corresponding relations as shown in Table 1 are searched, and it can be found out that a 3G network corresponding to the USB modem is a TD-SCDMA network.

In step 204, connection parameters of the USB modem are configured according to the type of the USB modem.

In the USB modems with different modes, network parameters corresponding to the modes are stored. For example, it is assumed that the 3G network corresponding to the USB modem is a TD-SCDMA network, the network parameters corresponding to the TD-SCDMA network are pre-stored in the USB modem. The router receives the network parameters through the USB interface and configures parameters according to the network parameters before accessing the network.

In addition to the above network parameters, the connection parameters of the USB modem further include parameters such as the user name and the user password that need to be set before the network is accessed.

In step 205, the USB modem is connected, according to the connection parameters, with the corresponding 3G network through a point-to-point protocol (PPP) link.

In step 206, the router accesses the 3G network through the USB modem and communicates with the 3G network.

After the USB modem is connected with the TD-SCDMA network through the PPP link, a wireless channel is established between the USB modem and the TD-SCDMA network. Data at the 3G network side can be transmitted to the USB modem through the wireless channel, and then transmitted to the router through the USB interface of the USB modem.

It should be noted that in the second embodiment, steps 201 to 204 illustrate that through the pre-stored corresponding relations between each type ID of the network module and the 3G network, the type of the network module is identified and the connection parameters are configured. However, in addition to the means of storing the corresponding relations, the type of the network module can be identified by the following means: After the router is connected with the USB modem through the USB interface, an identification command is sent to the USB modem; after the USB modem receives the identification command, a response command containing a corresponding mode of a 3G network is fed back to the router; after the router receives the response command, the 3G network corresponding to the USB modem is identified. Alternatively, after the router is connected with the USB modem through the USB interface, the router directly receive network parameters, which are transmitted through the USB interface, of the USB modem without identifying the mode of the USB modem; when the network parameters are configured, a traverse means is adopted, that is, the mode of the USB modem is firstly supposed as the WCDMA mode and parameters are configured according to the type; if the configuration is successful, the USB modem is connected with the WCDMA network; and if the configuration is not successful, parameters are further configured according to the TD-SCDMA mode; if the configuration is successful, the USB modem is connected with the TD-SCDMA network; if the configuration is not successful, parameters are further configured according to the CDMA mode.

In the above embodiment of the present invention the 3G networks with different modes can be accessed by identifying the types of different network modules, and therefore multi-mode upstream access can be satisfied, the application range of a router for accessing the 3G network can be widened and upstream access cost can be reduced.

Figure 3:
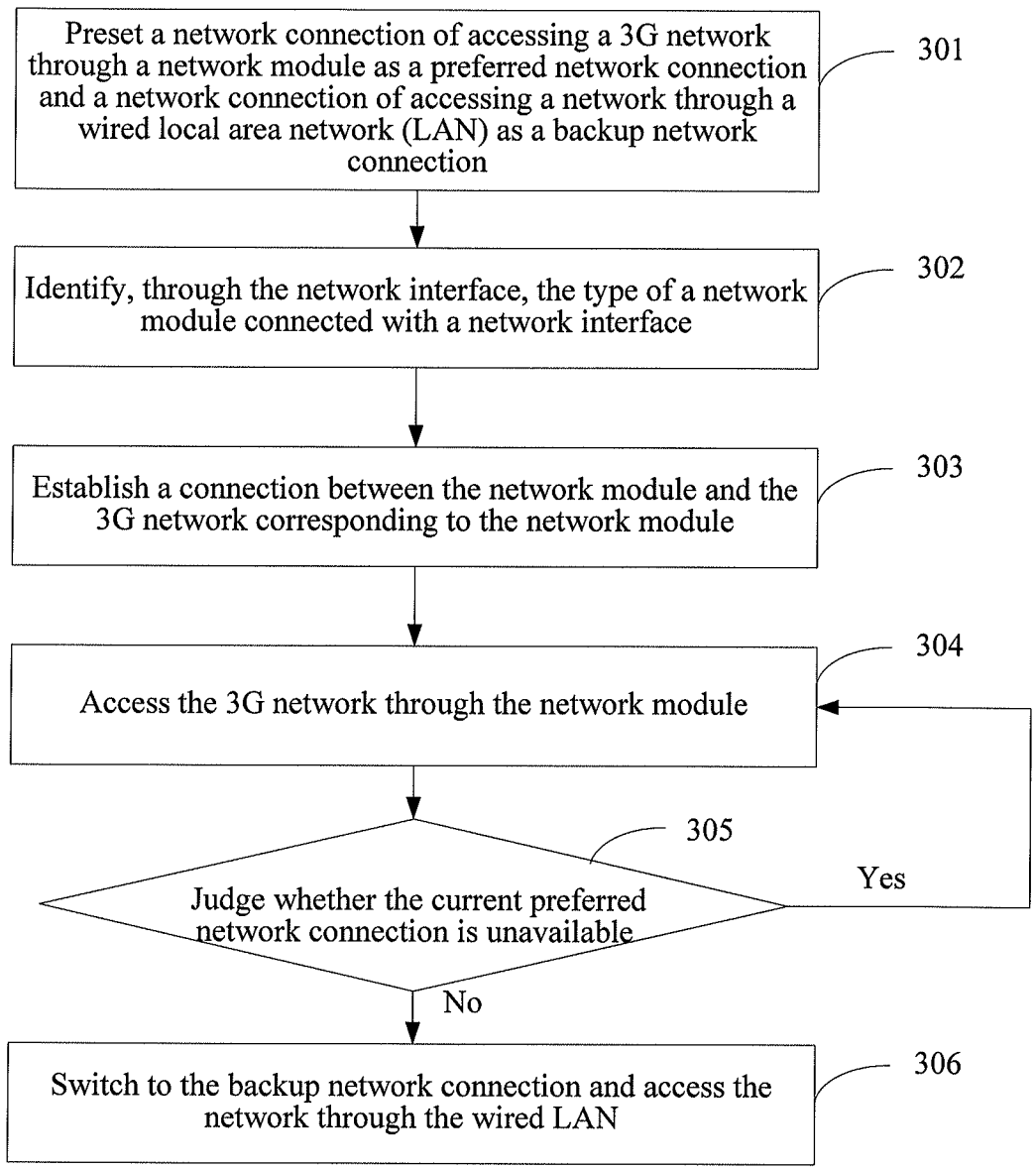
FIG. 3 is a flow chart of the method for accessing a network according to a third embodiment of the present invention.

FIG. 3 is a flow chart of a method for accessing a network according to a third embodiment of the present invention. The embodiment illustrates that a router can perform a access-switching process when the router accesses a network simultaneously in a wired manner and a wireless manner.

In step 301, a network connection of accessing a 3G network through a network module is preset as a preferred network connection and a network connection of accessing a network through a wired LAN is preset as a backup network connection.

In order to ensure reliability of a network connection, in addition to the wireless manner of accessing a 3G network through a network module, the router may also integrate the wired access manner of accessing a network through an LAN.

The network connection of accessing a 3G network through a network module can be set as the preferred network connection at the initial access, and the network connection of accessing through a wired LAN is a backup network connection when the preferred network connection is unavailable. It should be noted that the embodiment of the present invention is not intended to limit the setting of the preferred network connection and the backup network connection, and the preferred network connection and the backup network connection can be set flexibly according to requirements in the actual application.

In step 302, the type of a network module connected with a network interface is identified through the network interface.

In step 303, a connection between the network module and the 3G network corresponding to the network module is established.

In step 304, the 3G network is accessed through the network module.

In step 305, it is judged whether the current preferred network connection is unavailable, and if the current preferred network connection is unavailable, step 306 is performed; otherwise, back to step 304.

In step 306, the network connection is switched to the backup network connection and the network is accessed through the wired LAN.

In the above embodiments, the 3G networks with different modes can be accessed by identifying the types of different network modules, and therefore multi-mode upstream access is satisfied and upstream access cost is reduced. Moreover, the continuity and reliability of the network connection is ensured by setting a preferred network connection and a backup network connection.

Figure 4:
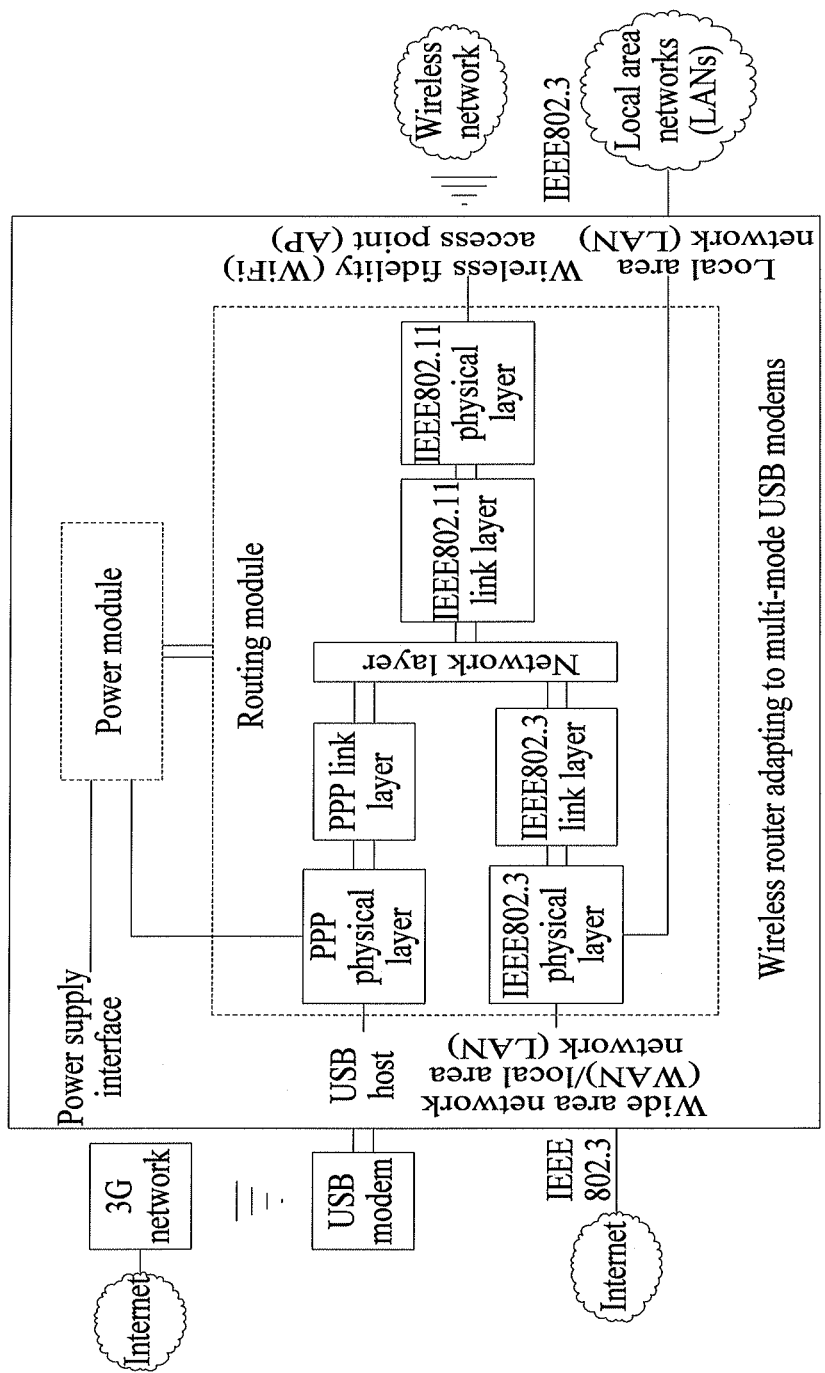
FIG. 4 is a schematic structural view of a router for accessing a network according to an embodiment of the present invention.

FIG. 4 is a schematic structural view of a router for accessing a network according to an embodiment of the present invention. As shown in FIG. 4, the network interface inside the router is a USB interface and the corresponding network module is a USB modem. Therefore, the router is a wireless router adapting to multi-mode USB modems. The structure of the router and the process of accessing a network are described as follows.

The router mainly includes two parts, namely, a power module and a router module. On a downstream channel, a wireless fidelity (WiFi) access point (AP) is provided to form a wireless LAN, and meanwhile, an LAN interface is provided to connect with a wired LAN. On an upstream channel, a wide area network (WAN) interface, the same as that of the conventional router, is provided, and meanwhile, in order to adapt to USB modems with different modes, a standard USB host interface is provided so as to realize serial communication with the USB modem.

The power module adopts a direct voltage input with a range from 12V to 36V, which can be converted into direct voltages of 3.3V, 2.5V, 1.8V and 5V respectively by turning on or off the power supply circuit. The voltage of 3.3V is used to supply power for the routing module; the voltage of 2.5V is used to supply power for the downstream LAN interface; the voltage of 1.8V is used to supply power for the WiFi AP; and the voltage of 5V is used to supply power for the USB host interface.

The routing module is the main part of the wireless router, and the routing module can be divided into three layers in turn according to the transmission control protocol/internet protocol (TCP/IP) model, that is, a network layer, a data link layer, and a physical layer. Meanwhile, the routing module is divided into three channels according to functions of the router, that is, IEEE802.11 wireless LAN channel configured to provide WiFi AP function for the router, IEEE802.3 wired LAN channel configured to access a network in a wired manner through the WAN/LAN interface, and PPP channel configured to provide the point-to-point data connection for the router and access a 3G network in a wireless manner through the connected USB modem.

When the router uses the USB modem to connect with the Internet, the router can identify the mode of the connected USB modem through the standard USB host interface of the router. After connection parameters of the USB modem are set, PPP is used to establish the connection between the USB modem and the 3G network, and the Internet is accessed through the 3G network. After the connection and at the time of data communication, data from the Internet is transmitted to the USB modem from the 3G network side. The USB modem transmits the data to the PPP physical layer of the router through the USB interface. The data passes through the PPP data link layer and is transmitted to the network layer. At the network layer, a route is selected according to IP and the data is continued to be transmitted in downstream to the wired LAN or wireless LAN. Whatever kind of 3G networks, the router identifies the corresponding modem through the network interface of the router, and after the 3G network is accessed, Internet service is provided to the user in the wireless manner.

When the router uses the WAN/LAN interface to connect with the Internet, data passes through the IEEE802.3 physical layer and the IEEE802.3 data link layer and is transmitted to the network layer. At the network layer, a route is selected according to the IP, and the data is then continued to be transmitted in downstream to a wired LAN or a wireless LAN. The transmission manner is the same as the transmission manner widely used in the conventional router, and thus details are not repeated again here.

It should be noted that in the above embodiment, the network interface of the router is not limited to the USB interface, and thus the network module for accessing the 3G network is also not limited to the USB modem. When the network interface is a PCMCIA interface, the network module for accessing the 3G network should be a corresponding PCMCIA modem; and when the network interface is a user-defined interface, any corresponding modem for accessing the 3G network is available as long as the modem has an interface adapting to the user-defined interface.

Corresponding to the embodiments of the method for accessing a network, embodiments of the present invention further provide a system and an apparatus for accessing a network.

Figure 5:
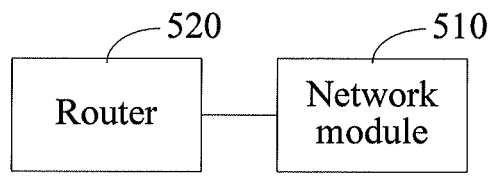
FIG. 5 is a block diagram of a system for accessing a network according to an embodiment of the present invention.

FIG. 5 is a block diagram of a system for accessing a network according to an embodiment of the present invention. As shown in FIG. 5, the system includes a network module 510 and a router 520.

The network module 510 is configured to establish a connection with the 3G network. The router 520 is connected with the network module 510 through a network interface, and is configured to identify the type of the network module 510 through the network interface, where one type of each network module 510 corresponds to one type of 3G network; according to the type of the network module 510, establish the connection between the network module 510 and the 3G network corresponding to the network module 510; and access the 3G network through the network module 510.

The router 520 is further configured to pre-store corresponding relations between the type ID of each network module 510 and the 3G network. After a network interface of the router 520 accesses the network module 510, the router 520 is configured to read the type ID of the network module 510 through the network interface and search the corresponding relations to obtain the 3G network corresponding to the type ID.

The router 520 is further configured to preset a network connection of accessing the 3G network through the network module 510 as a preferred network connection and preset a network connection of accessing the network through a wired LAN as a backup network connection. When the preferred network connection is unavailable, the router 520 is configured to switch to the backup network connection and access the network through the wired LAN.

Figure 6:
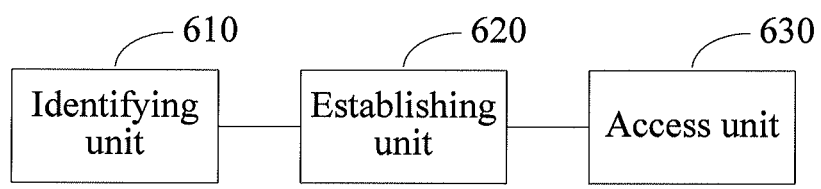
FIG. 6 is a block diagram of an apparatus for accessing a network according to a first embodiment of the present invention.

FIG. 6 is a block diagram of an apparatus for accessing a network according to a first embodiment of the present invention. As shown in FIG. 6, the apparatus includes an identifying unit 610, an establishing unit 620, and an access unit 630.

The identifying unit 610 is configured to identify, through the network interface, the type of a network module connected with a network interface, and each type of the network module corresponds to one type of 3G network; the establishing unit 620 is configured to establish, according to the type of the network module, a connection between the network module and the 3G network corresponding to the network module; and the access unit 630 is configured to access the 3G network through the network module.

Figure 7:
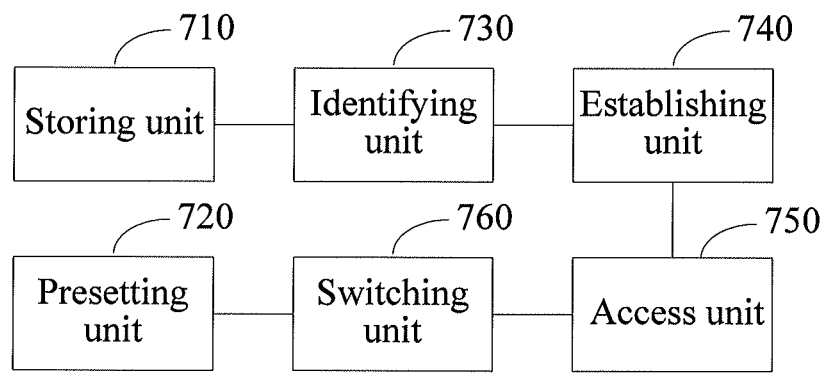
FIG. 7 is a block diagram of the apparatus for accessing a network according to a second embodiment of the present invention.

FIG. 7 is a block diagram of the apparatus for accessing a network according to a second embodiment of the present invention. As shown in FIG. 7, the apparatus includes a storing unit 710, a presetting unit 720, an identifying unit 730, an establishing unit 740, an access unit 750, and a switching unit 760.

The storing unit 710 is configured to pre-store corresponding relations between each type ID of the network module and the 3G network; the presetting unit 720 is configured to preset a network connection of accessing the 3G network through the network module as a preferred network connection and preset a network connection of accessing the network through a wired LAN as a backup network connection; the identifying unit 730 is configured to identify, through the network interface, the type of a network module connected with a network interface, where each type of the network module corresponds to one type of 3G network; the establishing unit 740 is configured to establish, according to the type of the network module, a connection between the network module and the 3G network corresponding to the network module; the access unit 750 is configured to access the 3G network through the network module; the switching unit 760 is configured to switch to the backup network connection according to the setting of the presetting unit 720 when the proffered network connection is unavailable, and access the network through the wired LAN.

Specifically, the identifying unit 730 may include (not shown in FIG. 7) a reading unit, configured to read the type ID of the network module through the network interface; and a search unit, configured to search the corresponding relations stored in the storing unit to obtain the 3G network corresponding to the type ID.

Specifically, the identifying unit 730 may also include (not shown in FIG. 7) a sending unit, configured to send an identification command to the network module; a receiving unit, configured to receive a response command that contains the corresponding mode of the network module and is fed back, according to the identification command, by the network module; and a determining module, configured to determine, according to the mode in the response command, the 3G network corresponding to the network module.

Specifically, the identifying unit 730 may also include (not shown in FIG. 7) a receiving unit, configured to receive network parameters transmitted by the network module; a traversing unit, configured to traverse the pre-stored types of the 3G network, and configure the network parameters according to each type of the 3G network; and a determining unit, configured to determine the 3G network as the 3G network corresponding to the network module when the network parameters is configured successfully.

Specifically, the establishing unit 740 may include (not shown in FIG. 7) a configuring unit, configured to configure connection parameters of the network module according to the type of the network module, and a connecting unit, configured to connect, according to the connection parameters, the network module with the corresponding 3G network through a PPP link.

It can be known from descriptions of the embodiments of the present invention, in the embodiments of the present invention, the type of a network module connected with a network interface is identified through the network interface; according to the identification result, a connection between the network module and the 3G network corresponding to the network module is established; and the 3G network is accessed through the network module. In the embodiments of the present invention, the 3G networks with different modes can be accessed by identifying the types of different network modules, and therefore multi-mode upstream access can be satisfied, the application range of a router for accessing the 3G network is widened, and upstream access cost is reduced when different 3G networks with different modes need to be accessed.

It can be understood by persons of ordinary skills in the art that all or part of the steps of the method in the above embodiments can be accomplished by a program instructing relevant hardware. The program may be stored in a computer readable storage medium. When the program runs, the following steps are included: the type of a network module connected with a network interface is identified through the network interface, where each type of the network module corresponds to one type of 3G network; a connection between the network module and the 3G network corresponding to the network module is established; and the 3G network is accessed through the network module. The storage medium may be mediums such as a Read-Only Memory (ROM)/Random Access Memory (RAM), a magnetic disk, and a compact disk.

Although the present invention is described through embodiments, persons of ordinary skills in the art understand that the present invention may have many modifications and variations without departing from the spirit of the present invention, and the modifications and variations should fall within the protection scope of appended claims as long as they do not depart from the spirit of the present invention.

What is claimed is:

1. A method for accessing a network, comprising:
   identifying, by a router, through the network interface, a type of a network module connected with a network interface, wherein the type of the network module corresponds to one type of 3G network;
   establishing, by the router, according to the type of the network module, a connection between the network module and the 3G network corresponding to the network module; and
   accessing, by the router, the corresponding 3G network through the network module.

2. The method according to claim 1, wherein the identifying, by the router, through the network interface, the type of the network module connected with the network interface comprises:
   reading, by the router, a type identification (ID) of the network module through the network interface; and
   searching, by the router, pre-stored corresponding relations between the type ID of the network module and the 3G network to obtain the 3G network corresponding to the read type ID of the network module.

3. The method according to claim 1, wherein the identifying, by the router, through the network interface, the type of the network module connected with the network interface comprises:
   sending, by the router, an identification command to the network module;
   receiving, by the router, a response command that contains a corresponding mode of the network module and is fed back, according to the identification command, by the network module; and
   determining, by the router, the 3G network corresponding to the network module according to the corresponding mode in the response command.

4. The method according to claim 1, wherein the identifying, by the router, through the network interface, the type of the network module connected with the network interface comprises:
   receiving, by the router, network parameters transmitted by the network module;
   traversing, by the router, the pre-stored types of the 3G network and configuring, according to each type of the 3G network, the network parameters; and
   determining, by the router, the 3G network as the 3G network corresponding to the network module when the network parameters is configured successfully.

5. The method according to claim 1, wherein the establishing, by the router, according to the type of the network module, the connection between the network module and the 3G network corresponding to the network module comprises:
   configuring, by the router, connection parameters of the network module according to the type of the network module; and
   connecting, by the router, according to the connection parameters, the network module with the 3G network corresponding to the network module through a point-to-point protocol (PPP) link.

6. The method according to claim 1, further comprising:
   presetting, by the router, a network connection for accessing a 3G network through a network module as a preferred network connection and presetting a network connection for accessing a network through a wired local area network (LAN) as a backup network connection;
   wherein, after the accessing the 3G network through the network module, the method further comprises:
   switching, by the router, to the backup network connection and accessing the network through the wired LAN when the preferred network connection is unavailable.

7. The method according to claim 1, wherein the network interface comprises one of a universal serial bus (USB) interface, a personal computer memory card international association (PCMCIA) interface, and
   a user-defined interface;
   the 3G network comprises one of a time division-synchronous code division multiple access (TD-SCDMA) network, a wideband code division multiple access (WCDMA) network, and a code division multiple access (CDMA) network.

8. A system for accessing a network, comprising:
   a network module, configured to establish a connection with a 3G network; and
   a router, connected with the network module through a network interface, configured to identify, through the network interface, a type of the network module, wherein the type of the network module corresponds to one type of 3G network; and configured to establish, according to the type of the network module, a connection between the network module and the 3G network corresponding to the network module, and access the 3G network through the network module.

9. A router for accessing a network, comprising:
   a processor, configured to identify, through the network interface, the type of a network module connected with a network interface, wherein the type of the network module corresponds to one type of 3G network;
   to establish, according to the type of the network module, a connection between the network module and the 3G network corresponding to the network module; and
   to access the 3G network through the network module.

10. The router according to claim 9, wherein the router further comprising:
    a memory, configured to pre-store corresponding relations between the type identification (ID) of the network module and the 3G network;
    wherein, the processor is further:
    configured to read the type ID of the network module through the network interface; and
    to search the corresponding relations stored in the storing unit to obtain the 3G network corresponding to the read type ID of the network module.

11. The router according to claim 9, wherein the processor is further
    configured to send an identification command to the network module;

to receive a response command that contains the corresponding mode of the network module and is fed back, according to the identification command, by the network module; and to determine, according to the mode in the response command, the 3G network corresponding to the network module.

12. The router according to claim 9, wherein the processor is further configured to receive network parameters transmitted by the network module;

to traverse the pre-stored types of the 3G network and configure the network parameters according to each type of the 3G network; and to determine the 3G network as the 3G network corresponding to the network module when the network parameters is configured successfully.

13. The router according to claim 9, wherein the processor is further configured to configure the connection parameters of the network module according to the type of the network module; and to connect, according to the connection parameters, the network module and the 3G network corresponding to the network module through a point-to-point protocol (PPP) link.

14. The router according to claim 9, wherein the processor is further configured to preset a network connection for accessing a 3G network through a network module as a preferred network connection and preset a network connection for accessing a network through a wired local area network (LAN) as a backup network connection; and to switch, according to the setting of the presetting, to the backup network connection and access the network through the wired LAN unit when the preferred network connection is unavailable.

* * * * *